US012334640B1

(12) United States Patent
Hand et al.

(10) Patent No.: US 12,334,640 B1
(45) Date of Patent: Jun. 17, 2025

(54) WAVEGUIDE ANTENNA STRUCTURES WITH CONCURRENT TRANSMIT AND RECEIVE

(71) Applicant: Lockheed Martin Corporation, Bethesda, MD (US)

(72) Inventors: Thomas Henry Hand, Highlands Ranch, CO (US); Joshua David Gustafson, Castle Rock, CO (US); Adam Blair Hess, Denver, CO (US); Thomas Patrick Cencich, Littleton, CO (US); Braiden T. Olds, Highlands Ranch, CO (US); Joseph M. Torres, Littleton, CO (US); Erik Lier, Lakewood, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/440,087

(22) Filed: Feb. 13, 2024

Related U.S. Application Data

(63) Continuation of application No. 17/737,487, filed on May 5, 2022, now Pat. No. 11,936,112.

(51) Int. Cl.
*H01Q 21/00* (2006.01)
*H01Q 1/52* (2006.01)
*H01Q 3/22* (2006.01)
*H01Q 21/20* (2006.01)
*H01Q 21/30* (2006.01)

(52) U.S. Cl.
CPC ......... *H01Q 21/0056* (2013.01); *H01Q 1/523* (2013.01); *H01Q 3/22* (2013.01); *H01Q 21/20* (2013.01); *H01Q 21/30* (2013.01)

(58) Field of Classification Search
CPC ...... H01Q 21/0056; H01Q 1/523; H01Q 3/22; H01Q 21/20; H01Q 21/30
See application file for complete search history.

(56) References Cited

U.S. PATENT DOCUMENTS 2,908,001 A 10/1959 Kelly
3,090,956 A 5/1963 Woodward et al.
(Continued)

FOREIGN PATENT DOCUMENTS

CN 107994354 A 5/2018
JP 2006005432 A 1/2006

OTHER PUBLICATIONS

Perdana, M. Y. et al., "Design Of Vivaldi Microstrip Antenna For Ultra-Wideband Radar Applications," IOP Conf. Series: Materials Science and Engineering, 10 pages, 2017.

*Primary Examiner* — Hai V Tran
*Assistant Examiner* — Jordan E. DeWitt

(57) ABSTRACT

Provided herein are various enhancements for antenna systems and directed radio frequency energy structures. In one example, an apparatus includes an antenna array comprising a plurality of antenna elements formed by waveguide structures embedded within a substrate and positioned about a longitudinal axis of the substrate to form at least two concentric ring arrangements of antenna elements. Apertures of the waveguide structures are configured to emit or receive radio frequency (RF) energy generally along the longitudinal axis. Feed elements are coupled to each of the waveguide structures on an end opposite of the apertures, and configured to couple the RF energy for the antenna array.

20 Claims, 9 Drawing Sheets

(56) References Cited

U.S. PATENT DOCUMENTS

| | | | |
|---|---|---|---|
| 3,305,867 A | 2/1967 | Miccioli et al. | |
| 3,508,277 A * | 4/1970 | Bartholomew | H01Q 13/08 343/776 |
| 4,937,585 A | 6/1990 | Shoemaker | |
| 5,041,840 A | 8/1991 | Cipolla et al. | |
| 5,103,237 A | 4/1992 | Weber | |
| 5,243,358 A | 9/1993 | Sanford et al. | |
| 5,504,493 A | 4/1996 | Hirshfield | |
| 5,515,057 A * | 5/1996 | Lennen | H01Q 1/243 342/357.29 |
| 5,793,335 A | 8/1998 | Anderson et al. | |
| 5,838,282 A | 11/1998 | Lalezari et al. | |
| 5,953,477 A * | 9/1999 | Wach | G02B 6/4203 385/115 |
| 6,043,785 A | 3/2000 | Marino | |
| 6,243,522 B1 * | 6/2001 | Allan | C03B 37/01205 385/124 |
| 6,268,835 B1 | 7/2001 | Toland et al. | |
| 6,356,241 B1 | 3/2002 | Jaeger et al. | |
| 6,661,305 B1 * | 12/2003 | Rosenberg | H01P 5/082 333/24 R |
| 6,720,932 B1 | 4/2004 | Flynn et al. | |
| 9,246,236 B2 | 1/2016 | Lecam et al. | |
| 9,379,437 B1 * | 6/2016 | Stutzke | H01Q 3/36 |
| 9,614,290 B1 | 4/2017 | Remski | |
| 11,133,604 B1 | 9/2021 | West et al. | |
| 2004/0041741 A1 | 3/2004 | Hayes | |
| 2005/0007289 A1 | 1/2005 | Zarro et al. | |
| 2007/0063791 A1 | 3/2007 | Wu et al. | |
| 2007/0296518 A1 | 12/2007 | Avramis et al. | |
| 2008/0062056 A1 * | 3/2008 | Hoferer | H01Q 25/007 343/840 |
| 2008/0297428 A1 | 12/2008 | Wu | |
| 2010/0149061 A1 | 6/2010 | Haziza | |
| 2010/0207833 A1 | 8/2010 | Toso et al. | |
| 2011/0002263 A1 | 1/2011 | Zhu et al. | |
| 2011/0050527 A1 | 3/2011 | Anderson et al. | |
| 2011/0267250 A1 | 11/2011 | Seifried et al. | |
| 2013/0271321 A1 | 10/2013 | Anderson | |
| 2014/0294345 A1 * | 10/2014 | Kopp | G02B 6/30 385/24 |
| 2015/0236428 A1 | 8/2015 | Caratelli et al. | |
| 2016/0056542 A1 * | 2/2016 | Faraone | H01Q 21/0006 343/769 |
| 2016/0156325 A1 | 6/2016 | Boutayeb et al. | |
| 2016/0218436 A1 | 7/2016 | Rao et al. | |
| 2016/0261042 A1 | 9/2016 | Sazegar et al. | |
| 2017/0149134 A1 | 5/2017 | Klemes | |
| 2017/0276867 A1 * | 9/2017 | Kopp | G02B 6/30 |
| 2018/0076521 A1 | 3/2018 | Mehdipour et al. | |
| 2018/0219299 A1 | 8/2018 | Boutayeb et al. | |
| 2018/0269576 A1 | 9/2018 | Scarborough et al. | |
| 2018/0366825 A1 | 12/2018 | Klemes | |
| 2019/0020121 A1 | 1/2019 | Paulotto et al. | |
| 2019/0237873 A1 | 8/2019 | Sazegar et al. | |
| 2019/0252800 A1 | 8/2019 | Yetisir et al. | |
| 2019/0252801 A1 | 8/2019 | Mahanfar et al. | |
| 2019/0280387 A1 | 9/2019 | Posthuma et al. | |
| 2019/0288394 A1 * | 9/2019 | Saraf | H01Q 5/335 |
| 2020/0076086 A1 | 3/2020 | Cheng et al. | |
| 2020/0266548 A1 | 8/2020 | Navarro et al. | |
| 2020/0321677 A1 * | 10/2020 | Ali | H01Q 1/2283 |
| 2020/0343647 A1 | 10/2020 | Runyon et al. | |
| 2020/0348412 A1 * | 11/2020 | Durham | H01Q 21/28 |
| 2022/0224005 A1 | 7/2022 | Yun | |
| 2022/0328965 A1 | 10/2022 | Chalabi et al. | |
| 2022/0359989 A1 | 11/2022 | Wang et al. | |
| 2022/0399637 A1 * | 12/2022 | Navarro | F41G 7/2253 |

* cited by examiner

WAVEGUIDE ANTENNA STRUCTURES WITH CONCURRENT TRANSMIT AND RECEIVE

RELATED APPLICATIONS

This patent application is a continuation of, and claims priority to, U.S. patent application Ser. No. 17/737,487 that was filed on May 5, 2022, and is entitled "APERTURE ANTENNA STRUCTURES WITH CONCURRENT TRANSMIT AND RECEIVE," which is hereby incorporated by reference into this patent application.

TECHNICAL BACKGROUND

Various directional antenna types and configurations employ feed structures to introduce radio frequency (RF) signals to directional reflector elements or receive RF energy from the reflector elements. These reflector elements can include various dish or parabolic reflector arrangements, among others. For certain frequencies and communication modes, the feed structures can become large and complex structures that employ specialized antenna arrangements. Example arrangements include multi-arm sinuous or spiral antennas (planar or conical) which reside on a feed structure for a parabolic reflector operating in a dual-mode (e.g. mode 1 and mode 2) configuration. Typical solutions to achieving mode 1 (sum) and mode 2 (difference) patterns for the purposes of direction finding (DF), involve the use of weighted control of sinuous or spiral (multi arm) antennas, such as by applying a 45-degree or 90-degree phase offset to achieve the mode 1 or mode 2 patterns, respectively.

However, these multi-arm sinuous or spiral antennas radiate energy in both upper and lower hemispheres. To provide for feed operations, these antennas require the placement of a cavity and absorber disk beneath the lower hemisphere to maintain adequate pattern performance in the upper hemisphere to feed the directional element. This limits the antenna feed efficiencies of these designs to 50% or less. Thus, such antenna arrangements essentially operate with less gain and RF performance for the sake of achieving mode 1 and mode 2 patterns by proper phasing of the sinuous/spiral arms, and translate to having an antenna feed and reflector system oversized by 3 decibels (dB), or 2$x$ in reflector area (or 1.414× diameter), in order to meet a given performance target. In addition to the efficiency decreases in these arrangements, the cavity and absorber add additional complexity and cost to the systems, while limiting the maximum power handling of the feed.

OVERVIEW

Provided herein are various enhancements for antenna systems and directed radio frequency (RF) energy structures to achieve a constant beamwidth over a wide bandwidth (greater than one octave). One example antenna arrangement includes an array of aperture antenna elements, also referred to as circular waveguide (CWG) apertures, that do not require a cavity backed absorber to shape the radiation pattern. Advantageously, the examples herein provide for higher RF performance—higher efficiency and the ability to realize higher gain patterns, as well as providing improvements in manufacturability and cost. For reflector antenna applications, the examples herein result in larger directivity values with smaller beam widths, allowing its incorporation in larger focal length-to-diameter (f/D) systems to improve cross-polarization performance and overall aperture efficiency. Additionally, different geometrical configurations are presented herein to obtain a flatter gain and beam width over a given frequency range than other designs. The gain and beamwidth of these aperture element arrays can be adjusted by changing the array size and quantity of apertures. Although four (4) or eight (8) element arrays (each for transmit and receive) are discussed herein, similar concepts can apply to other quantities of antenna elements. Additionally, traditional approaches only allow for a single beam per antenna assembly. Thus, these traditional approaches require separate reflector antenna apertures and reflector antenna feed assemblies to achieve both transmit and receive operations. Advantageously, the examples herein can provide for multi-beam applications within the same feed assembly. Moreover, concurrent or simultaneous transmit and receive can be achieved from the same assembly, sometimes referred to as full duplex communications.

In one example, an apparatus includes an antenna array comprising a plurality of antenna elements formed by waveguide structures embedded within a substrate and positioned about a longitudinal axis of the substrate to form at least two concentric ring arrangements of antenna elements. Apertures of the waveguide structures are configured to emit or receive radio frequency (RF) energy generally along the longitudinal axis. Feed elements are coupled to each of the waveguide structures on an end opposite of the apertures, and configured to couple the RF energy for the antenna array.

In another example, an antenna array is provided. The antenna array includes antenna elements comprising waveguide structures arranged into concentric sets about a central axis, the waveguide structures each comprising apertures at first longitudinal ends and feed points at second longitudinal ends. Each set among the concentric sets are sized to emit or receive, at corresponding apertures, radio frequency signals having a frequency range specific to that set.

In yet another example, a method comprises obtaining first radio frequency (RF) energy at feed points for coupling to first antenna elements comprising first waveguide structures arranged about a longitudinal axis, and transmitting the first RF energy from apertures of the first waveguide structures. The method includes receiving second RF energy at apertures of second antenna elements comprising second waveguide structures arranged about the longitudinal axis and concentric with the first waveguide structures, and providing the second RF energy for delivery to receiver circuitry over feed points of the second antenna elements.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are antenna feed structures and systems that provide for multi-mode operation with high efficiency beyond that of many existing antenna types. Multi-arm sinuous and spiral antennas (planar or conical) radiate energy in both upper and lower hemispheres, and require nearby placement of a cavity and absorber disk on the lower hemisphere to maintain adequate pattern performance in the upper hemisphere to feed a directional element. This limits the antenna feed efficiencies of these designs to 50% or less. However, the examples discussed herein can readily achieve efficiencies of approximately 90% or greater. One example antenna arrangement discussed herein includes an array of aperture antenna elements that do not require a cavity backed absorber to shape the radiation pattern to a single hemisphere. Although many of the examples employ eight (8) or more aperture antenna elements for a total transmit and receive array, other quantities can be employed.

Figure 1:
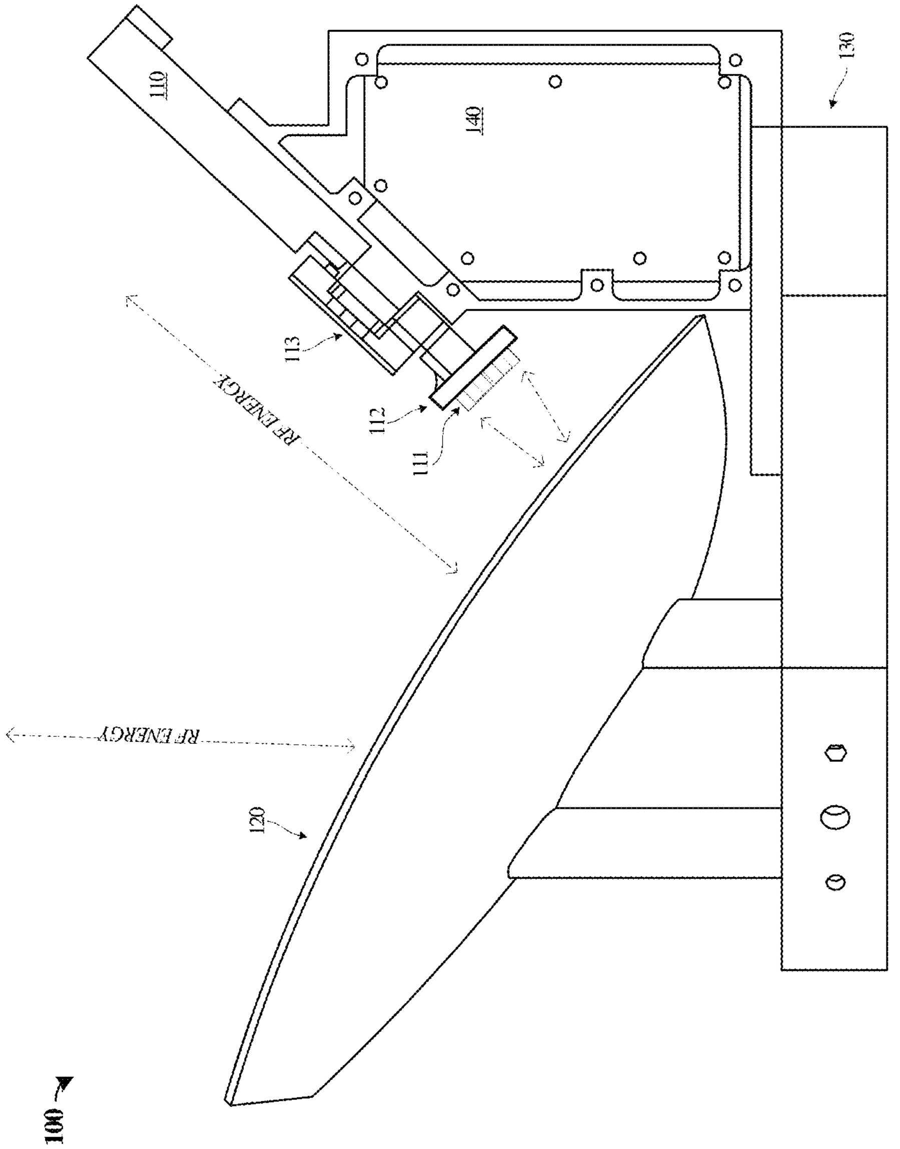
FIG. 1 illustrates an example reflector antenna system in an implementation.

FIG. 1 illustrates example antenna system 100 which includes an enhanced feed structure 110. System 100 includes feed structure 110, reflector 120, mount structure 130, and optional communication beamforming network 140, although the exact configuration of the elements in FIG. 1 can vary based on application. Antenna system 100 can be employed on various systems and structures, such as terrestrial structures or vehicles, airborne or spaceborne vehicles, or other similar entities. Various links and interconnect can couple elements of antenna system 100 to other external elements, such as transmitter equipment, receiver equipment, transceiver equipment, power amplifiers, signal amplifiers, or other elements, which can be included in communication beamforming network 140. RF signals can be received over these links from transmitter equipment for transmission by feed structure 110, and likewise, signals received by feed structure 110 can similarly be fed over these links to receiver equipment.

Feed structure 110 is configured to direct RF energy to reflector 120 for transmission (Tx) activities and receive RF energy from reflector 120 during receive (Rx) activities. Concurrent Tx and Rx activities might be supported in certain examples. Feed structure 110 and reflector 120 are mounted to a shared structure, namely mount structure 130, which provides structural support, positioning, and in some examples, tracking of the antenna elements toward a target or desired endpoint. Feed structure 110 can include elements of beamforming network 140.

Feed structure 110 includes antenna array 111 placed at or near the focus of reflector 120. Antenna array 111 comprises an array of aperture or circular waveguide (CWG) type of antenna elements mounted to baseplate 112. Baseplate 112 can couple antenna array 111 to various interconnect represented by connections 113. Connections 113 can comprise coaxial RF connections for coaxial cables or other suitable waveguide elements, although variations are possible. Connections 113 might couple feed structure 110 to various receiver or transmitter circuitry, which may be included in communication beamforming network 140 or other external systems. In transmission operations, RF energy carried over connections 113 is provided to individual antenna elements within antenna array 111 for emission and reflection by reflector 120. In reception operation, RF energy is gathered by reflector 120 for direction to individual antenna elements within antenna array 111 for transfer over connections 113 to communication receiver equipment.

Turning to a further detailed discussion on the elements of FIG. 1, reflector 120 comprises an RF reflector element which can direct and focus RF energy toward a target or received from a source. Various types of parabolic or shaped reflectors can be employed, such as dish, paraboloidal, axially displaced paraboloid, cylindrical, shaped beam, or other types. Although only a primary reflector 120 is shown in FIG. 1, other arrangements might include one or more secondary reflectors, such as in Cassegrain and Gregorian arrangements. Also, not shown in FIG. 1 for clarity, various types of shrouds, radomes, or sunshields might be included around feed structure 110 or reflector 120.

Connections 130 comprise RF connections and associated links to communication equipment used to drive antenna array 111. Connections 130 might comprise various types of coaxial connectors or waveguide connectors. Connections 130 might couple between antenna elements of antenna array 111 and low-noise block downconverter (LNB), amplifier equipment, or other transceiver equipment. Various coaxial cabling or waveguide sections can be included.

Communication beamforming network 140 can include various circuitry, components, transceivers, interconnect, amplifiers, and other elements to support the transmission or reception of RF signals via antenna system 100. Communication beamforming network 140 can comprise any of the aforementioned transmitter, receiver, transceiver, amplifier, LNB, or signal handling elements. Communication beamforming network 140 might be external to the elements shown in FIG. 1. Communication beamforming network 140 can also include various control elements for beamforming, directional control, mode switching, phase control, diagnostics, telemetry and status, or other control elements. These control elements can include various computer systems or microprocessor-based systems which execute software or firmware to achieve any of the operations discussed herein.

As mentioned above, feed structure 110 includes antenna array 111 comprised of individual antenna elements. The individual antenna elements within antenna array 111 comprise aperture antenna elements, with sets of four or eight such elements employed in this example for each Tx or Rx arrangement. The geometry and arrangement of the individual antenna elements can influence the directivity, beam width, frequency range, and other factors. Several example array types and arrangements are discussed herein. The various example arrays in FIGS. 1-7 do not require an absorber element or absorber cavity to shape a bidirectional radiation pattern into a unidirectional beam in a single hemisphere. Instead, the arrangement of elements of the array and the use of waveguide aperture antenna elements provide for unidirectionality of the beam (in a single hemisphere).

Figure 2:
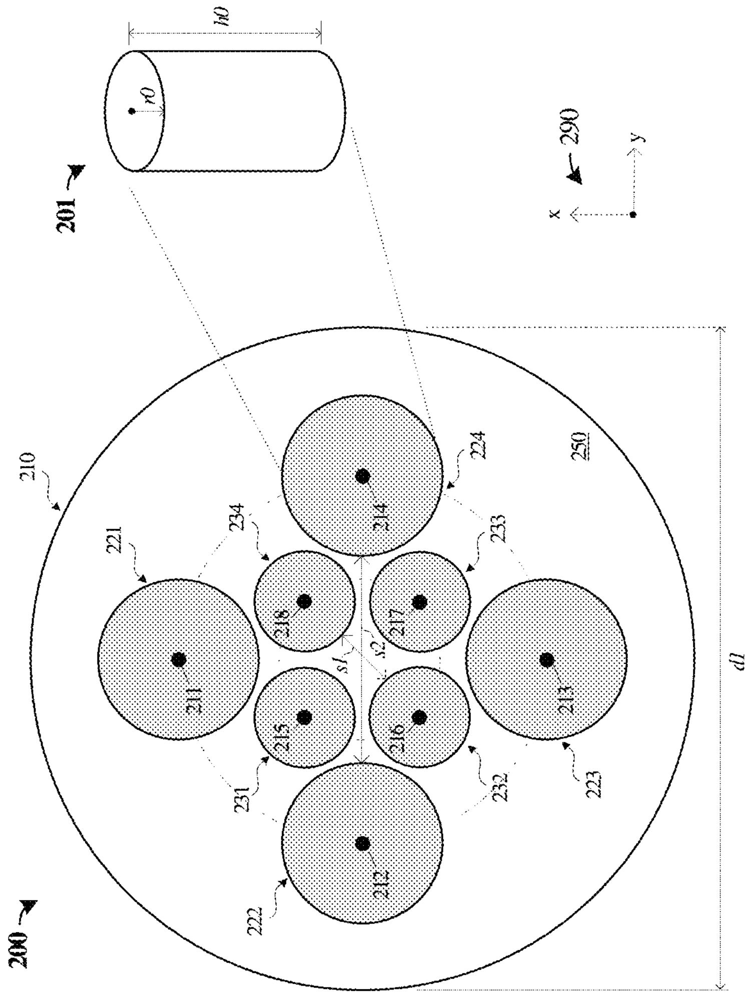
FIG. 2 illustrates an example eight element aperture antenna array in an implementation.

FIG. 2 includes view 200 that illustrates a top view of an example antenna array 210 having an outer ring of aperture antenna elements 221-224 surrounding an inner ring of aperture antenna elements 231-234. FIG. 2 also include directional axes 290, to which the elements in view 200 are referenced. In this example, eight antenna elements are included in antenna array 210, with four antenna elements are employed in the inner ring, and four antenna elements are employed in the outer ring. Each of the aperture antenna elements is fed by corresponding aperture feed elements 211-218, which are individually coupled to transmit or receive circuitry or beamforming circuitry (not shown). Further views of aperture antenna elements 221-224 and 231-234 are included in FIG. 3, as discussed below.

Aperture antenna elements 221-224 and 231-234 comprise generally cylindrical waveguides formed into substrate 250 having diameter d1 and arrayed about a central longitudinal axis of substrate 250. The material of substrate 250 might comprise a metallic or conductive bulk material into which aperture antenna elements 221-224 and 231-234 are formed via drilling, machining, etching, or other processes. Conductive features can be formed from aluminum, copper, silver, gold, or other conductive material, including combinations or alloys thereof. Alternatively, aperture antenna elements 221-224 and 231-234 can be formed by additive manufacturing processes, such as 3D printing or injection molding techniques. If a non-conductive material is used for substrate 250, then conductive coatings or surface treatments can be applied to aperture antenna elements 221-224 and 231-234 and to various portions of substrate 250. While the examples herein employ a cylindrical stock, webbing, or bulk that houses the apertures within the substrate, other configurations are possible, such as mechanically fastened waveguide tubes. Also, although generally cylindrical waveguides and substates are employed, other shapes and configurations can be used such as elliptical, square, rectangular, hexagonal, and irregular.

Figure 8:
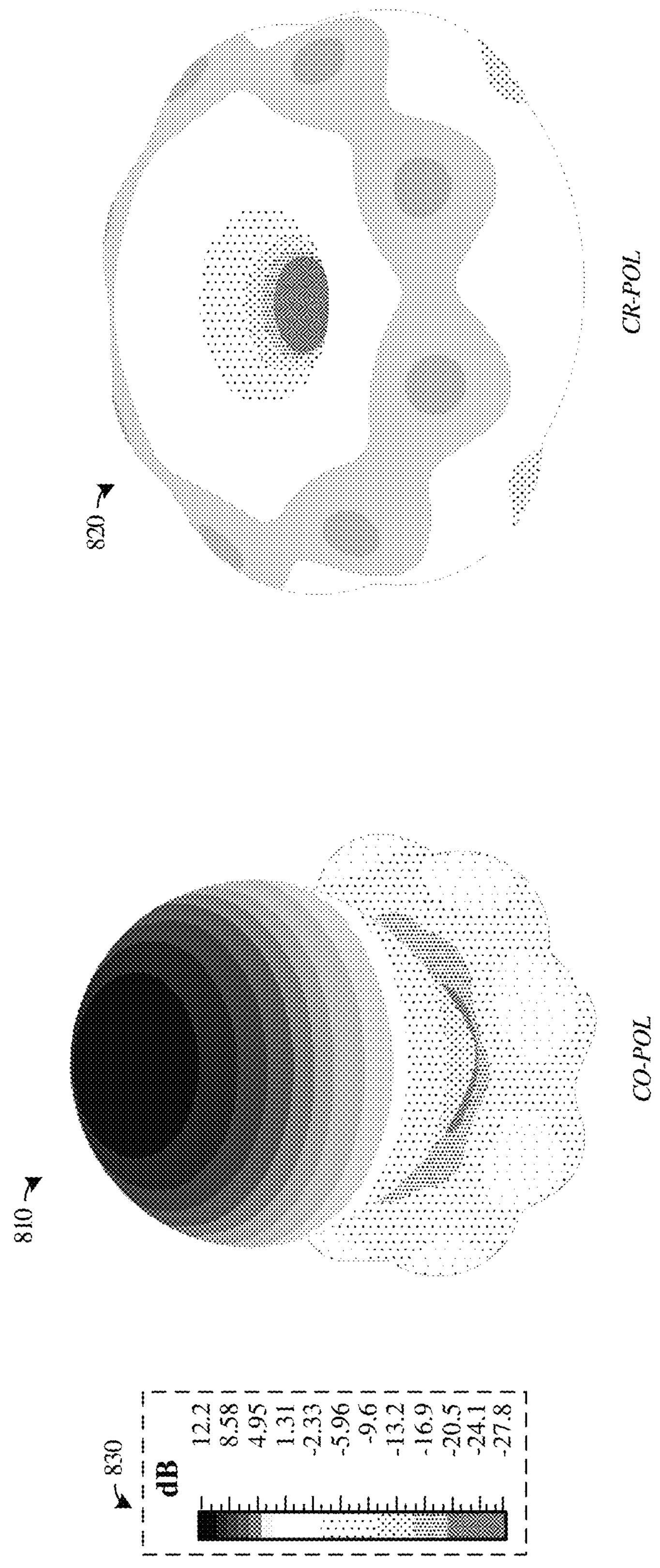
FIG. 8 illustrates example antenna array far-field pattern performance in an implementation.
Figure 9:
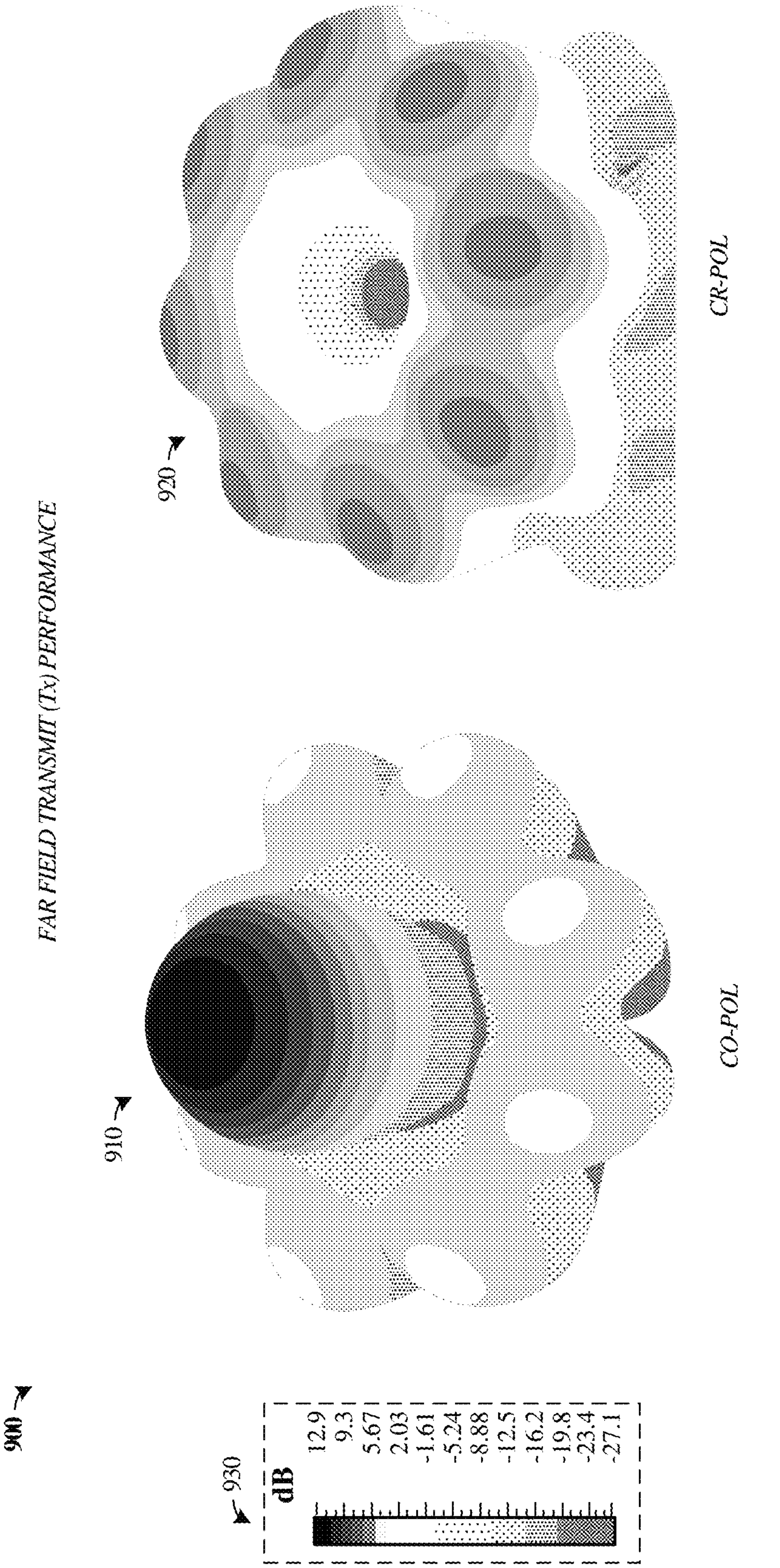
FIG. 9 illustrates example antenna array far-field pattern performance in an implementation.

The quantity of aperture antenna elements in antenna array 210 can affect the variation in RF radiation patterns, such that more elements correspond to a smoother RF radiation pattern. When beamforming network are employed, a larger quantity of aperture antenna elements can provide for higher performance beamforming. More than one instance or set of antenna array 210 can be established to provide for further beamforming and directionality design goals. Examples of RF radiation patterns is shown in FIGS. 8 and 9, for 16-element antenna arrays having two concentric Tx/Rx rings of eight antenna elements.

Aperture antenna elements 221-224 and 231-234 can have a corresponding height (or depth into the substrate material) of h0 and radius r0, as shown in detailed view 201. In FIG. 2, the inner ring of antenna elements 231-234 typically will have a smaller aperture radius than that of the outer ring of antenna elements 221-224. The length or depth of aperture antenna elements 221-224 and 231-234 are proportional to an amount of isolation between aperture antennas, such as a deeper (longer) waveguide structure corresponds to greater isolation, and vice versa. The radius/width of each of the aperture/waveguide structure corresponds to the frequency range suitable for the structure, with higher frequencies corresponding to smaller radii/widths and lower frequencies corresponding to larger radii/widths. An example relationship between radius of the waveguide and cutoff frequency is $f=1.8412c/2\pi r$, where f is cutoff frequency, c is the speed of light, and r is radius of the waveguide (each in appropriate units). Typically, the transverse electric mode TE11 and transverse magnetic mode TM11 are the dominant modes in a circular waveguide, with TEl1 commonly employed. For the example shown in FIG. 2, the inner ring of aperture antenna elements 231-234 will correspond to a higher frequency band than the outer ring of aperture antenna elements 221-224. The inner ring is shown having separation s1 between opposite ones of the antenna elements, and the outer ring is shown having separation s2 between opposite ones of the antenna elements.

Typically, each ring of aperture antenna elements corresponds to a mode of operation, such as transmit or receive modes. In FIG. 2, the inner ring corresponds to Tx operations, and the outer ring corresponds to Rx operations, although variations are possible. Due to the frequency characteristics noted above, this corresponds to the Tx operations having a higher frequency band than the Rx operations. Moreover, concurrent Tx and Rx operations can be provided by antenna array 210, with isolation between Tx and Rx provided not only by different frequency bands, but the physical structure of the waveguides forming the aperture antennas. Each aperture antenna or waveguide thus acts as a narrowband cutoff element. While TE11 modes are generally supported by the example ring arrays or circular lattices herein, other transmission or receive modes can be employed.

Aperture feed elements 211-218 are shown for each aperture antenna element in FIG. 2. While the type of aperture feed can vary, example types include pin radiators at the base of the corresponding cavities, which may have tapered features, shaped features, or geometric arrangements at the termination end to increase coupling bandwidth between the feed link and the antenna element. Other types include backwall or sidewall feeds, or waveguide-fed structures. To couple the feed elements to transmit/receive circuitry or beamforming circuitry, various links can be provided (not show), such as coaxial feed links, waveguides, or other links suitable for carrying amplified microwave RF signals. Reference potentials or RF grounds can be coupled to the bulk material forming antenna array 210 when formed from a single conductive material, or can be coupled to conductive walls of each of the apertures when coatings or surface treatments are employed over non-conductive materials.

In operation, emission of RF energy is directed outwards from the 'top' of antenna array 210, and is typically in the TE11 propagation mode. Likewise, reception of RF energy is provided by RF signals incident onto the top of antenna array 210. In transmission operations, RF energy generated by a transmitter or signal amplifier is introduced through coaxial cables or other similar links to a connector or baseplate (not shown) which couples the RF energy to corresponding Tx feed elements 215-218. Tx feed elements 215-218 propagate this RF energy into the waveguide cavity of each aperture antenna element, which then propagates down the channel created by the waveguides for eventual free-space propagation. A similar action happens for reception operations, albeit in a reverse configuration, and involving Rx feed element 211-214. By selecting physical features of antenna array 210, such as length, radius, quantity, and separation of antenna elements, among other physical features, antenna array 210 can be tuned to achieve various frequency responses, gain properties, power handling capabilities, bandwidths, and impedance properties.

Figure 3:
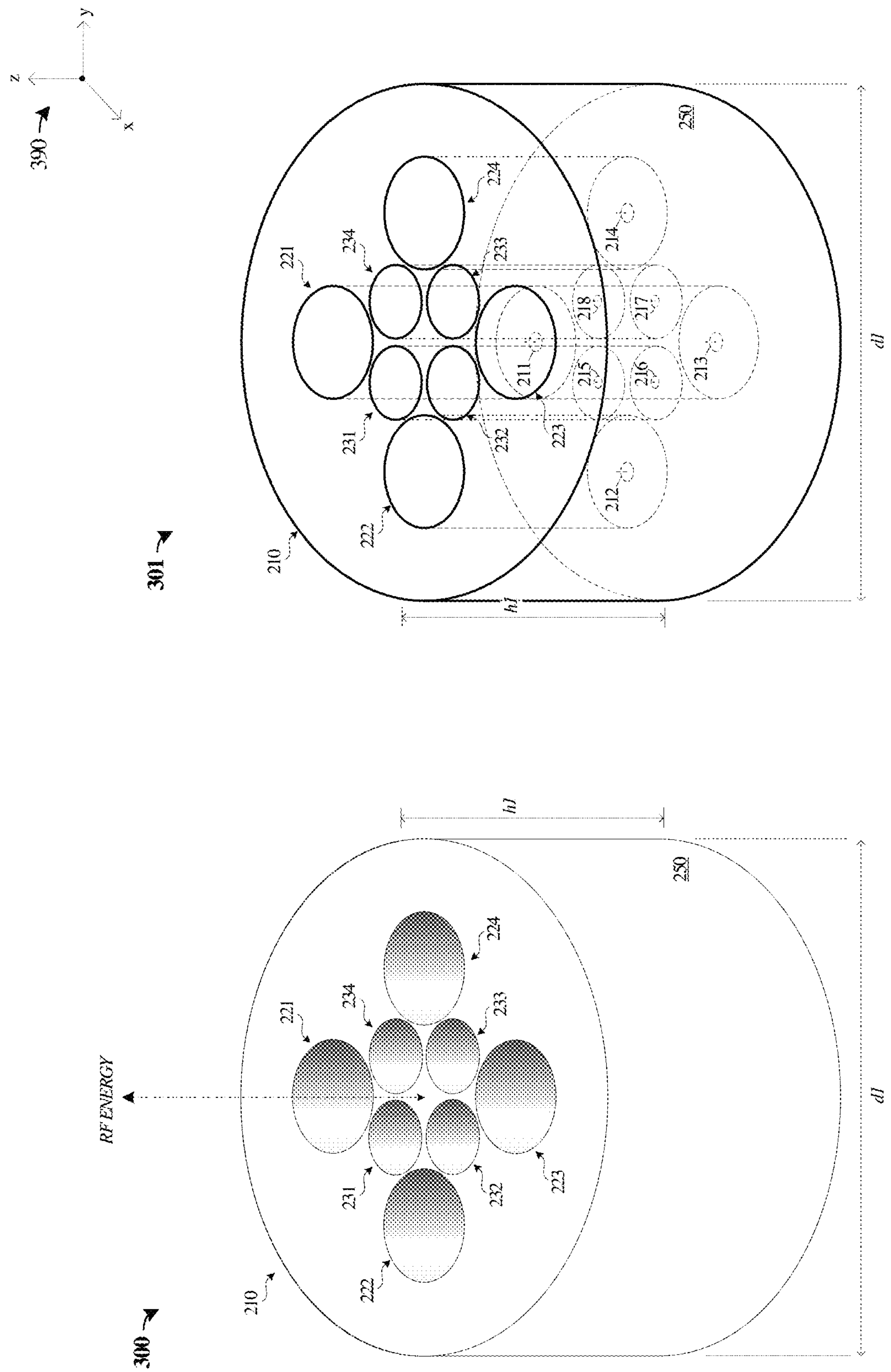
FIG. 3 illustrates example eight element aperture antenna arrays in an implementation.

FIG. 3 includes isometric views 300 and 301 illustrating further aspects of antenna array 210. While view 300 shows an opaque solid view of antenna array 210, view 301 shows a wireframe view highlighting internal features. FIG. 3 also include directional axes 390, to which the elements in views 300 and 301 are referenced. Antenna array 210 is shown as having a height of h1 in the z-axis or longitudinal axis of substrate 250, which may correspond to h0 from FIG. 2 or be slightly greater than h0 to accommodate a back plate, base plate, feed element, or other bottom-side. Also, example diameter d1 is shown which can accommodate two concentric rings or circular arrays of aperture antenna elements 221-224 and 231-234. While eight (8) elements in total are included in antenna array 210 and arrayed in the x-y plate about the central longitudinal axis of substrate 250, typically four will be reserved for Tx operations and four will be reserved for Rx operations. The exact elements assigned to Tx or Rx will vary based on which frequency bands are employed. Turning now to view 301, the vertical extent of each of aperture antenna elements 221-224 and 231-234 can be seen along with feed elements 211-218.

Figure 4:
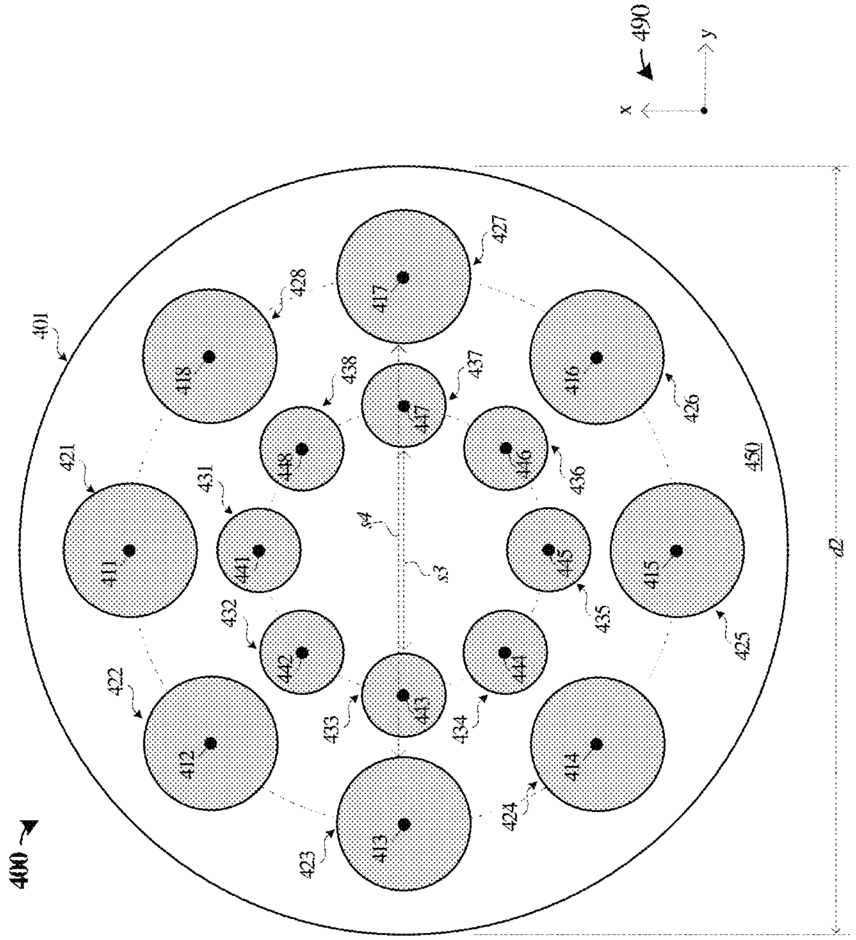
FIG. 4 illustrates an example sixteen element aperture antenna array in an implementation.

FIG. 4 includes view 400. FIG. 4 also include directional axes 490, to which the elements in view 400 are referenced. View 400 illustrates a top view of an example antenna array 410 having an outer ring of aperture antenna elements 421-428 surrounding an inner ring of aperture antenna elements 431-438. The inner ring and outer ring form a concentric arrangement in the x-y plane about a central longitudinal axis of substrate 450 of antenna array 410. In this example, sixteen (16) antenna elements are included in antenna array 410, with eight antenna elements are employed in the inner ring, and eight antenna elements are employed in the outer ring. Each of the aperture antenna elements is fed by corresponding aperture feed elements 411-418 and 441-448, which are individually coupled to transmit or receive circuitry or beamforming circuitry (not shown). Further configurations of 16-element aperture antenna arrays are included in FIG. 5, as discussed below.

Aperture antenna elements 421-428 and 431-438 comprise generally cylindrical waveguides formed into substrate 450 having diameter d2. A material comprising substrate 450 might comprise a metallic or conductive bulk material into which aperture antenna elements 421-428 and 431-438 are formed via drilling, machining, etching, or other processes. Conductive features can be formed from aluminum, copper, silver, gold, or other conductive material, including combinations or alloys thereof. Alternatively, aperture antenna elements 421-428 and 431-438 can be formed by additive manufacturing processes, such as 3D printing or injection molding techniques. If a non-conductive material is used for substrate 450, then conductive coatings or surface treatments can be applied to aperture antenna elements 421-428 and 431-438 and to various portions of substrate 450. While the examples of substrates herein employ a cylindrical stock, webbing, or bulk that houses the apertures within the substrate, other configurations are possible, such as mechanically fastened waveguide tubes. Also, although generally cylindrical waveguides and substates are employed, other shapes and configurations can be used such as elliptical, square, rectangular, hexagonal, and irregular.

The quantity of aperture antenna elements in antenna array 410 can affect the variation in RF radiation patterns, such that more elements correspond to a smoother RF radiation pattern. When beamforming network are employed, a larger quantity of aperture antenna elements can provide for higher performance beamforming. More than one instance or set of antenna array 410 can be established to provide for further beamforming and directionality design goals. Examples of RF radiation patterns is shown in FIGS. 8 and 9, for 16-element antenna arrays.

Aperture antenna elements 421-428 and 431-438 can have a corresponding height (or depth into the material of substrate 450) of h0 and radius r0, similar to that shown in detailed view 201 in FIG. 2. In FIG. 4, the inner ring of antenna elements 421-428 typically will have a smaller radius than that of the outer ring of antenna elements 431-438. The length or depth of aperture antenna elements 421-428 and 431-438 are proportional to an amount of isolation between aperture antennas, such as a deeper (longer) waveguide structure corresponds to greater isolation, and vice versa. The radius/width of each of the aperture/waveguide structure corresponds to the frequency range suitable for the structure, with higher frequencies corresponding to smaller radii/widths and lower frequencies corresponding to larger radii/widths. For the example shown in FIG. 4, the inner ring of aperture antenna elements 431-438 will correspond to a higher frequency band than the outer ring of aperture antenna elements 421-428. The inner ring is shown having separation s3 between opposite ones of the antenna elements, and the outer ring is shown having separation s4 between opposite ones of the antenna elements.

Typically, each ring of aperture antenna elements corresponds to a mode of operation, such as transmit or receive modes. In FIG. 4, the inner ring corresponds to Tx operations, and the outer ring corresponds to Rx operations, although variations are possible. Due to the frequency characteristics noted above, this corresponds to the Tx operations having a higher frequency band than the Rx operations. Moreover, concurrent Tx and Rx operations can be provided by antenna array 410, with isolation between Tx and Rx provided not only by different frequency bands, but the physical structure of the waveguides forming the aperture antennas. Each aperture antenna or waveguide thus acts as a narrowband cutoff element. While TE11 modes are generally supported by the example ring arrays or circular lattices herein, other transmission or receive modes can be employed.

Aperture feed elements 411-418 and 441-448 are shown for each aperture antenna element in FIG. 4. While the type of aperture feed can vary, example types include pin radiators at the base of the corresponding cavities, which may have tapered features, shaped features, or geometric arrangements at the termination end to increase coupling bandwidth between the feed link and the antenna element. Other types include backwall or sidewall feeds, or waveguide-fed structures. To couple the feed elements to transmit/receive circuitry or beamforming circuitry, various links can be provided (not show), such as coaxial feed links, waveguides, or other links suitable for carrying amplified microwave RF signals. Reference potentials or RF grounds can be coupled to the bulk material forming antenna array 410 when formed from a single conductive material, or can be coupled to conductive walls of each of the apertures when coatings or surface treatments are employed over non-conductive materials.

In operation, emission of RF energy is directed outwards from the 'top' of antenna array 410, and is typically in the TE11 propagation mode. Likewise, reception of RF energy is provided by RF signals incident onto the top of antenna array 410. In transmission operations, RF energy generated by a transmitter or signal amplifier is introduced through coaxial cables or other similar links to a connector or baseplate (not shown) which couples the RF energy to corresponding Tx feed elements 441-448. Tx feed elements 441-448 propagate this RF energy into the waveguide cavity of each aperture antenna element, which then propagates down the channel created by the waveguides for eventual free-space propagation. A similar action happens for reception operations, albeit in a reverse configuration and involving Rx feed elements 411-418. By selecting physical features of antenna array 410, such as length, radius, quantity, and separation of antenna elements, among other physical features, antenna array 210 can be tuned to achieve various frequency responses, gain properties, power handling capabilities, bandwidths, and impedance properties.

Figure 5:
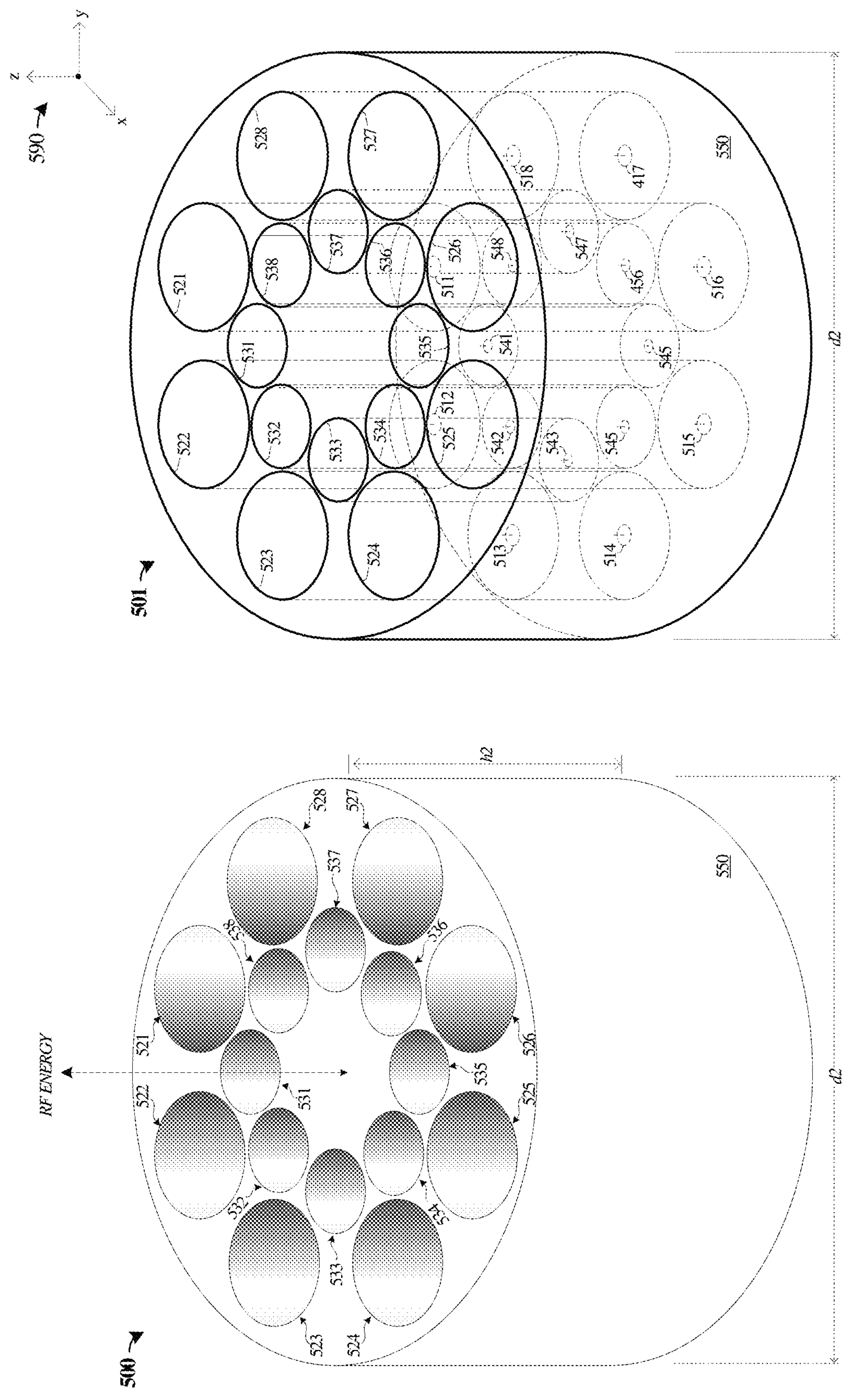
FIG. 5 illustrates examples of sixteen element aperture antenna arrays in an implementation.

FIG. 5 includes isometric views 500 and 501 illustrating further aspects of an antenna array 510, similar to that of antenna array 410. However, the exact configuration of antenna array 510 is more tightly packed with regard to the inner and outer ring of antenna elements, with the inner ring slightly rotated with respect to the outer ring. The inner ring and outer ring form a concentric arrangement in the x-y plane about a central longitudinal axis (z-axis) of substate 550 forming antenna array 510. Otherwise, similar elements as antenna array 410 can be included in antenna array 510, including feed elements. While view 500 shows an opaque solid view of antenna array 510, view 501 shows a wire-frame view highlighting internal features. Antenna array 510 is shown as having a height of h2, which may correspond to h0 from FIG. 2 or be slightly greater than h0 to accommodate a back plate, base plate, feed element, or other bottom-side. Also, example diameter d2 is shown which can accommodate two concentric rings or circular arrays of aperture antenna elements 421-428 and 431-438. While sixteen (16) elements in total are included in antenna array 510, typically eight will be reserved for Tx operations and eight will be reserved for Rx operations. The exact elements assigned to Tx or Rx will vary based on which frequency bands are employed. In view 501, the vertical extent along the longitudinal axis (z-axis) of each of aperture antenna elements 421-428 and 431-438 can be seen along with feed elements 511-518 and 541-548.

Although various frequency bands can be supported by the antenna arrays discussed herein, typically an approximately 17-31 GHz frequency range is supported for microwave Ka communications. The frequency bands supported can relate to the physical dimensions of antenna array waveguide structures. In example applications of the antenna structures mentioned herein, a satellite-to-ground system (or ground-to-satellite) can include a parabolic reflector feed employing the concentric waveguide arrangement. Concurrent transmit and receive operations can occur using the same feed array but different RF bands for Tx/Rx. For an example satellite, an Rx frequency band includes a 20 GHz centered band (19.45 GHz), and an Tx frequency band includes a 30 GHz centered band (29.25 GHz), both within the microwave Ka band. A ground station might employ an opposite arrangement for Rx/Tx. Spectral separation is established between Tx and Rx frequencies, with approximately 100 dB of rejection between the Tx/Rx bands. When the Tx and Rx bands are spectrally disjoint, a significant increase in isolation can be achieved.

In one example configuration, the Tx band covers 27.5-31 GHz, and utilizes open-ended waveguides (apertures) that cutoff below 27 GHz, resulting in very low coupling (−100 dB) into the Rx band of 17.7-21.2 GHz. The configurations shown in FIGS. 4 and 5 might employ a Tx (inner ring) waveguide radius of 0.1283 inch, and an Rx (outer ring) waveguide radius 0.1965 inch. The physical separation between individual inner waveguides and outer waveguides can be approximately 25 mil. With these configurations, a coupling between Tx/Rx apertures can be <−30 dB across the Ka band even though edges of elements only 25 mil apart. This represents a desirable isolation among Tx/Rx apertures, and can reduce the burden on RF filter design, such as inline stripline filters, for each antenna element in beamforming networks. More isolation can be achieved between Tx/Rx apertures by increasing the depth or length of each waveguide. Moreover, when the Tx and Rx bands are spectrally disjoint, a significant increase in isolation can be achieved in addition to the isolation from the physical arrangement of the antenna array. This combined spectral and physical isolation can achieve >90 dB isolation between the Tx and Rx elements.

The antenna array arrangements discussed herein advantageously provide for a low-complexity and high efficiency approach to a wideband multi-mode feed. More than one instance or set of an antenna array can be established to meet further beamforming and directionality design goals. An RF beam is directed largely away from the upper face of the substrate, achieving approximately a 90% total efficiency. These arrangements also can achieve dual circular polarization performance (RHCP and LHCP) over a wide bandwidth due to the spatial orthogonality of adjacent elements. Elements which are 90 degrees apart can be coupled to beamforming circuitry to realize dual-CP mode 1, mode 2, and higher order modes. These arrangements also can provide for more flexibility in choosing a wider range of F/D values in reflector systems, and leads to more benign F/D and subtended angles in reflector systems, such as those in FIG. 1. Improved cross-polarization in reflector systems can be achieved due to the smaller subtended angles in the feed which employs such arrangements. These arrangements also can be employed in RF receiver systems that leverage multi-mode beamforming (i.e. auto tracking feeds). These arrangements also improve the RF performance of system by reducing pre-LNA (low-noise amplifier) losses, which increases the antenna sensitivity for a given reflector diameter.

This compares favorably to the aforementioned multi-arm sinuous or spiral antennas which can only achieve efficiencies as high as 50% due to one-half of the radiated energy being absorbed by a cavity or absorber disk. No such cavity or absorber disk is required in these waveguide/aperture array examples to achieve the high efficiencies in a selected direction of emission/reception. Due in part to the lower part count/complexity and higher efficiency of the waveguide/aperture antenna array examples, for a given G/T (gain/noise temperature) or effective isotropic radiated power (EIRP) requirement, a reduction in the size of the main reflector by 30% or more is achieved, as well as providing for easier assembly and manufacturing. Array feed networks, discussed in the figures below, are also less complex than sinuous/spiral feeds, as the density of connectors is much lower from having the antenna elements spaced apart. In contrast, sinuous/spiral feeds typically have dense feed networks compressed into a central hub, making for difficult high-density RF connections. More conventional corrugated or axi-symmetric metallic horns are also much larger and higher in mass than the antenna arrays discussed herein, and the material selections are more flexible to form the substrate and waveguides than other antenna designs. Additional advantages include a wider range of gain values and illumination profiles on reflector systems compared with heritage sinuous or spiral antennas. The enhanced arrangements discussed herein provide for feeds and antenna systems which are no longer restricted to the low (−5-10 dBi directivity) and wide field of view of a sinuous or spiral antenna, as the individual waveguide/aperture type elements can be spaced or increased in quantity to realize much higher directivity (15 dBi or more, which permits their implementation in larger F/D reflector systems).

Each antenna element in FIGS. 1-5 can have a linear polarization (individually), but when arrayed as shown, and driven with a beamforming network, can achieve RH/LH circular polarizations. For example, Rx-corresponding antenna elements can be coupled to a 4:2 beamforming network (BFN), while Tx-corresponding antenna elements can be coupled to a separate 4:2 BFN. The terminology of 4:2 refers to four antenna elements coupled to two feed links, with a beamforming network configured to handle phasing and distribution of the links to each antenna element. Concurrent beams having associated circular polarizations can be established for both Tx and Rx in this manner. Narrowband isolation between Tx/Rx is achieved with these beamformers and the waveguide structures of Tx/Rx elements. Additionally, traditional approaches only allow for a single beam. Thus, these traditional approaches require separate reflector antenna apertures and reflector antenna feed assemblies to achieve both transmit and receive operations. Advantageously, the examples in FIGS. 1-5, among other examples herein, provide for multi-beam applications (i.e. concurrent transmit and receive) without separate reflector antenna apertures and reflector antenna feed assemblies. The interleaving of elements for increased isolation enables a transmit and a receive beam to be accommodated on a single feed illuminating a single reflector.

Figure 6:
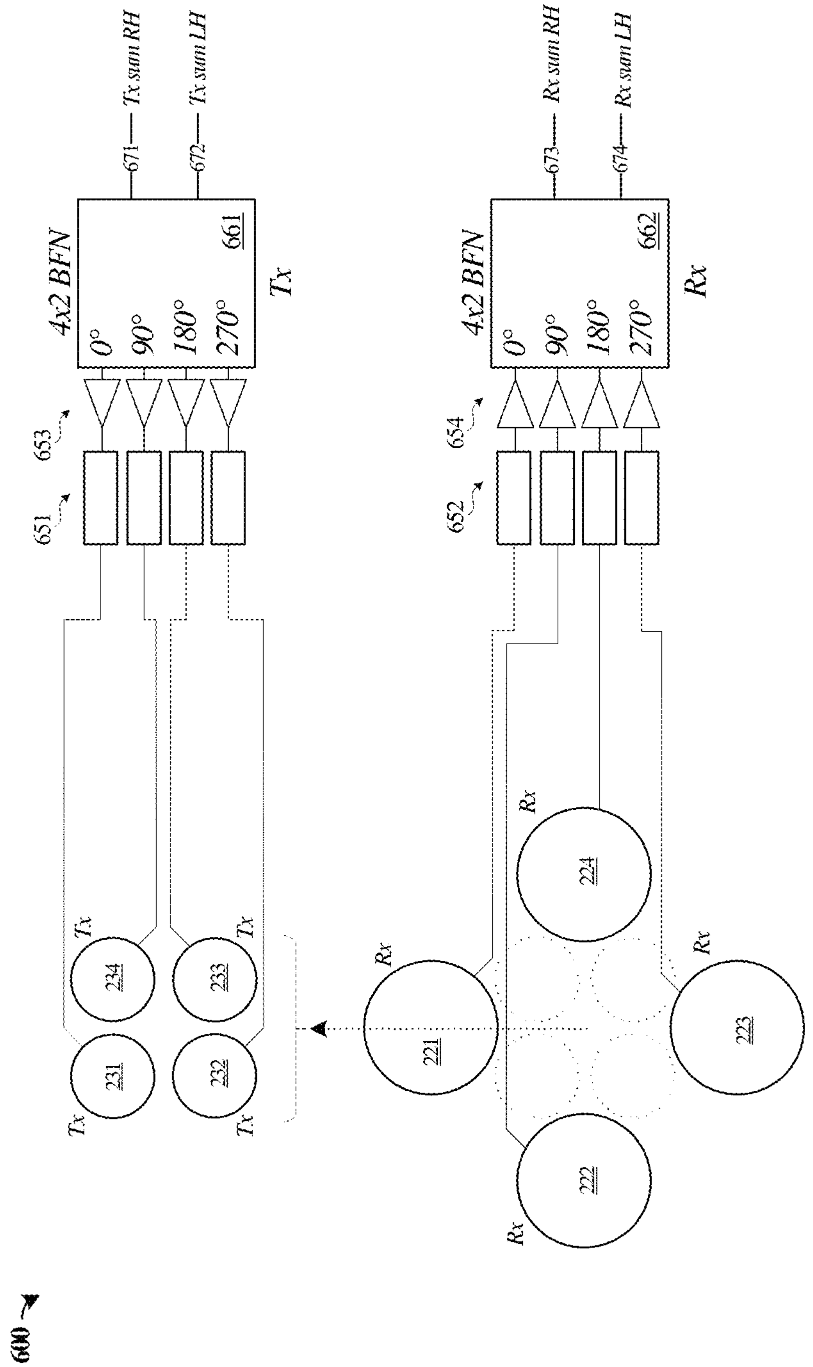
FIG. 6 illustrates an example antenna array feed network configuration in an implementation.

FIG. 6 illustrates an example antenna array feed network configuration 600 in an implementation, namely a dual four-feed beamforming configuration. Configuration 600 schematically shows apertures of an antenna array. Specifically, configuration shows antenna array 210 of FIG. 2 which comprises an inner ring of four antenna elements 231-234 concentric and within an outer four antenna elements 221-224. Each of the antenna elements comprises a waveguide structure noted herein. The inner ring corresponds to transmission elements (Tx), and the outer ring corresponds to receiver elements (Rx), although the opposite arrangement can be employed at the other end of a communication link. In FIG. 6, the inner ring is shown 'above' the outer ring for clarity, but in an actual antenna array all eight elements will be arrayed in a similar plane.

Configuration 600 shows each antenna element coupled to individual ones among optional in-line filters 651-652 (i.e. stripline filters) further coupled to individual ones among RF amplifiers 653-654. RF amplifiers 653-654 then couple to beamforming networks (BFNs) 661-662, with Tx and Rx elements having separate corresponding BFNs in this example. Input/output links 671-674 correspond in pairs to Tx and Rx sum signals for right-hand polarization (RH) and left-hand polarization (LH). Input/output links 671-674 couple to transmitter and receiver circuitry (not shown) configured to generate associated Tx RF signals or receive associated Rx RF signals.

Thus, a concentric arrangement of individual antenna elements within each antenna array is established. A first set of the antenna elements (231-234) are coupled to a 4:2 transmit (Tx) beamforming network 661 having signal inputs having more than one polarization component (671-672). A second set of the antenna elements (221-224) are coupled to a 4:2 receive (Rx) beamforming network having signal outputs having more than one polarization component (673-674). As can be seen for each BFN, an associated phase angle is established for each antenna element. To further elaborate, configuration 600 can establish a Tx phased array with antenna elements 231-234 fed by transmit beamforming network 661. Transmit beamforming network 661 comprises beamforming circuitry configured to receive input signals (671-672) having at least two polarization components and couple the at least two polarization components among antenna elements 231-234. Configuration 600 forms an Rx phased array with antenna elements 221-224 coupled to receive beamforming network 662. Receive beamforming network 662 comprises beamforming circuitry configured to receive RF energy from each of antenna elements 221-224 and form output signals (673-674) having at least two polarization components.

Figure 7:
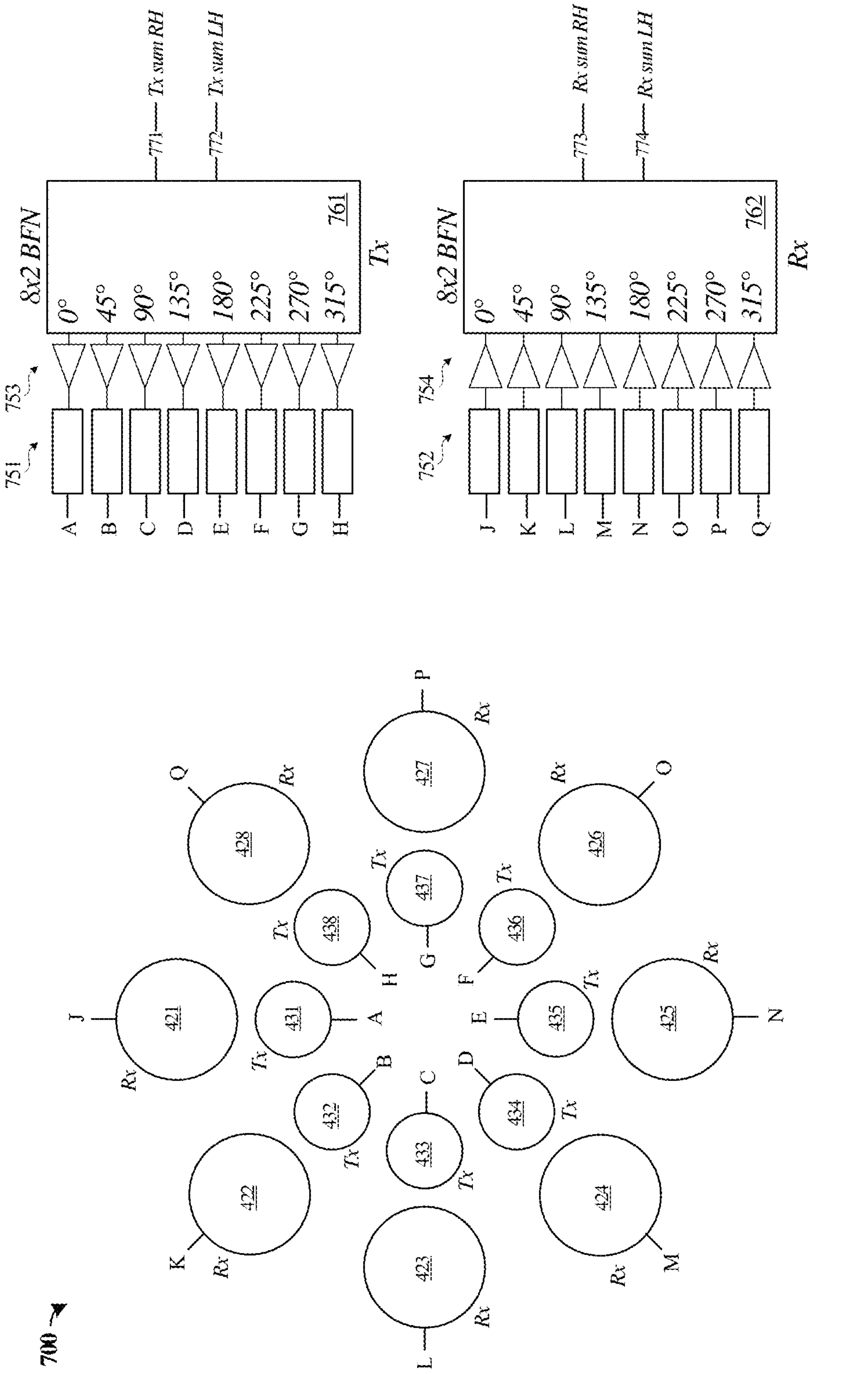
FIG. 7 illustrates an example antenna array feed network configuration in an implementation.

FIG. 7 illustrates an example antenna array feed network configuration 700 in an implementation, namely a dual eight-feed beamforming configuration. Configuration 700 schematically shows apertures of an antenna array. Specifically, configuration shows antenna array 410 of FIG. 4 which comprises an inner ring of eight antenna elements 431-438 concentric and within an outer eight antenna elements 421-428. Each of the antenna elements comprises a waveguide structure noted herein. The inner ring corresponds to transmission elements (Tx), and the outer ring corresponds to receiver elements (Rx), although the opposite arrangement can be employed at the other end of a communication link. In FIG. 7, the links between beamforming network elements and antenna elements are symbolized with an associated letter for clarity. In actual systems, RF links, such as coaxial links, with be employed. Also, although the discussion of FIG. 7 is in the context of elements of FIG. 4, it should be understood that similar principles apply for elements of FIG. 3.

Configuration 700 shows each antenna element coupled to individual ones among optional in-line filters 751-752 (i.e. stripline filters) further coupled to individual ones among RF amplifiers 753-754. RF amplifiers 753-754 then couple to beamforming networks (BFNs) 761-762, with Tx and Rx elements having separate corresponding BFNs in this example. Input/output links 771-774 correspond in pairs to Tx and Rx sum signals for right-hand polarization (RH) and left-hand polarization (LH). Input/output links 771-774 couple to transmitter and receiver circuitry (not shown) configured to generate associated Tx RF signals or receive associated Rx RF signals.

Thus, a concentric arrangement of individual antenna elements within each antenna array is established. A first set of the antenna elements (431-438) are coupled to a 8:2 transmit (Tx) beamforming network 761 having signal inputs having more than one polarization component (771-772). A second set of the antenna elements (421-428) are coupled to an 8:2 receive (Rx) beamforming network having signal outputs having more than one polarization component (773-774). As can be seen for each BFN, an associated phase angle is established for each antenna element. To further elaborate, configuration 700 can establish a Tx phased array with antenna elements 431-438 fed by transmit beamforming network 761. Transmit beamforming network 761 comprises beamforming circuitry configured to receive input signals (771-772) having at least two polarization components and couple the at least two polarization components among antenna elements 431-438. Configuration 700 forms an Rx phased array with antenna elements 421-428 coupled to receive beamforming network 762. Receive beamforming network 762 comprises beamforming circuitry configured to receive RF energy from each of antenna elements 421-428 and form output signals (773-774) having at least two polarization components.

To further highlight the performance advantages of the example antenna arrangements in the aforementioned Figures, characterization graphs 810 and 820 are included in FIG. 8, and characterization graphs 910 and 920 are included in FIG. 9. FIGS. 8 and 9 illustrate example antenna array performance in an implementation, namely for antenna arrays 410 or 510 in FIGS. 4 and 5. Similar performance can be extrapolated for antenna array 20 in FIG. 2, albeit with a less 'smooth' radiation pattern due to fewer antenna elements. Also pictured is a corresponding scale 830 and 930 which indicate performance in decibels (dB) for each graph.

Antenna arrays 410 or 510 each comprise a 16-element arrangements with an inner ring and an outer ring typically associated with one among Tx or Rx operations. FIG. 8 shows example performance for the outer ring of eight (8) antenna elements in an Rx mode of operation, and FIG. 9 shows example performance for the inner ring of eight (8) antenna elements in a Tx mode of operation.

Turning first to FIG. 8, Rx characterization results are shown for antenna arrays 410 or 510. Graph 810 shows co-polarization performance and graph 820 shows cross-polarization performance for an array of 8 aperture antenna elements configured for Rx operations at a target frequency of 19.5 GHz. This configuration produces a "Mode 1" or "Sum" RF energy sensitivity far-field beam pattern, as shown. Turning next to FIG. 9, Tx characterization results are shown for antenna arrays 410 or 510. Graph 910 shows co-polarization performance and graph 920 shows cross-polarization performance for an array of 8 aperture antenna elements configured for Tx operations at a target frequency of 29.25 GHz. This configuration produces a "Mode 1" or "Sum" RF energy emission far-field beam pattern, as shown. These results indicate a forward gain of antenna arrays 410 or 510, which correspond to the directionality or beamwidth characteristics of antenna arrays 410 or 510. Thus, the characterization results in FIGS. 8 and 9 indicate that the 16-element arrays from FIGS. 4 and 5 permit mode 1 and 2 generation over a wide bandwidth, with a controllable beamwidth, in a reduced simplified manufacturing approach. The gain and beamwidth of these element arrays can be adjusted by changing the geometries of the apertures.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

waveguide structures aligned parallel to a longitudinal axis, each of the waveguide structures forming an aperture antenna having an aperture end and a feed end;

a first set of the waveguide structures configured to transmit first radio frequency (RF) energy concurrent with a second set of the waveguide structures configured to receive second RF energy; and wherein the waveguide structures comprise narrowband cutoff configurations having selected lengths that achieve a target isolation level between the first RF energy and the second RF energy.

2. The apparatus of claim 1, wherein a frequency range corresponding to the first RF energy is at least partially overlapping with a frequency range corresponding to the second RF energy during concurrent transmit and receive.

3. The apparatus of claim 2, wherein the target isolation level between the first RF energy and the second RF energy corresponds to a coupling of less than −30 decibels.

4. The apparatus of claim 1, wherein a frequency range corresponding to the first RF energy is disjoint from a frequency range corresponding to the second RF energy during concurrent transmit and receive.

5. The apparatus of claim 4, wherein the target isolation level comprises at least 90 decibels.

6. The apparatus of claim 1, wherein the target isolation level is achieved by physical structures of the waveguide structures establishing the narrowband cutoff configurations.

7. The apparatus of claim 1, wherein the narrowband cutoff configurations support TE11 propagation modes.

8. The apparatus of claim 1, wherein the first set of the waveguide structures forms a first ring concentric with the second set of the waveguide structures that forms a second ring about the longitudinal axis.

9. The apparatus of claim 8, wherein the waveguide structures of the first ring comprise first waveguide aperture widths configured to emit the first RF energy of least a first frequency range concurrent with the waveguide structures of the second ring; and wherein the waveguide structures of the second ring comprise second waveguide aperture widths configured to receive the second RF energy of at least a second frequency range.

10. The apparatus of claim 8, wherein the waveguide structures in the first ring comprise four waveguide structures configured to transmit the first RF energy; and wherein the waveguide structures in the second ring comprises four waveguide structures configured to receive the second RF energy.

11. The apparatus of claim 8, wherein the waveguide structures in the first ring comprise eight waveguide structures configured to transmit the first RF energy; and wherein the waveguide structures in the second ring comprises eight waveguide structures configured to receive the second RF energy.

12. The apparatus of claim 1, wherein the first set of the waveguide structures corresponds to a separately controlled beam than the second set of the waveguide structures.

13. The apparatus of claim 1, comprising:

feed elements coupled to feed ends of the waveguide structures configured to couple associated RF energy of the waveguide structures in accordance with a beamforming configuration; and wherein the beamforming configuration comprises the first set of the waveguide structures configured to transmit the first RF energy using at least one among a 4:2 and 8:2 first beamforming configuration, and the second set of the waveguide structures configured to receive the second RF energy using at least one among a 4:2 and 8:2 second beamforming configuration.

14. The apparatus of claim 1, wherein cross-sectional shapes of the waveguide structures comprise at least one among circular, elliptical, square, rectangular, hexagonal, and irregular.

15. An antenna feed, comprising:

aperture antennas comprising waveguide structures arranged parallel with respect to a longitudinal axis, each of the waveguide structures having an aperture end and a feed end and comprising a narrowband cutoff configuration;

wherein first ones of the waveguide structures are configured to transmit first radio frequency (RF) energy concurrent with second ones of the waveguide structures configured to receive second RF energy.

16. The antenna feed of claim 15, comprising:

feed elements coupled to feed ends of the waveguide structures configured to couple associated RF energy of the waveguide structures in accordance with a beamforming configuration; and wherein the beamforming configuration comprises the first ones of the waveguide structures configured to transmit the first RF energy using at least one among a 4:2 and 8:2 first beamforming configuration, and the second ones of the waveguide structures configured to receive the second RF energy using at least one among a 4:2 and 8:2 second beamforming configuration.

17. The antenna feed of claim 15, wherein the first ones of the waveguide structures form a first ring concentric with the second ones of the waveguide structures that form a second ring about the longitudinal axis.

18. The antenna feed of claim 17, wherein the waveguide structures of the first ring comprise first waveguide aperture widths configured to emit the first RF energy of least a first frequency range concurrent with the waveguide structures of the second ring; and wherein the waveguide structures of the second ring comprise second waveguide aperture widths configured to receive the second RF energy of at least a second frequency range.

19. The antenna feed of claim 15, wherein the first ones of the waveguide structures corresponds to a separately controlled beam than the second ones of the waveguide structures.

20. The antenna feed of claim 15, comprising:

the antenna feed positioned at or near a focus of a reflector; and the reflector element configured to receive the first RF energy from the first ones of the waveguide structures and provide the second RF energy to the second ones of the waveguide structures.

* * * * *